United States Patent [19]

Woodall et al.

[11] Patent Number: 5,484,639
[45] Date of Patent: Jan. 16, 1996

[54] CARPET AND CARPET BACKING WITH DIRECTIONAL GUIDE

[75] Inventors: Kenneth Woodall; Jeffery Segars, both of Cartersville, Ga.

[73] Assignee: Shaw Industires, Inc., Dalton, Ga.

[21] Appl. No.: 47,741

[22] Filed: Apr. 15, 1993

[51] Int. Cl.⁶ ........................................ B32B 3/02
[52] U.S. Cl. .................. 428/95; D5/25; D5/60
[58] Field of Search ...................... 428/95; D5/25, D5/46, 56, 60

[56] References Cited

U.S. PATENT DOCUMENTS

| | | | |
|---|---|---|---|
| D. 23,838 | 12/1894 | Morgan | D5/60 |
| D. 23,839 | 12/1894 | Morgan | D5/60 |
| D. 61,679 | 11/1922 | Lord | D5/46 |
| D. 66,157 | 12/1924 | Vandergaw et al. | D5/25 |
| D. 66,827 | 3/1925 | Binkovitz | D5/60 |
| D. 79,907 | 11/1929 | Perkins | D5/46 |
| D. 113,268 | 2/1939 | Lehmann | D5/60 |
| D. 125,692 | 3/1941 | Josephson | D5/46 |
| D. 137,932 | 5/1944 | Kemper | D5/60 |
| D. 166,285 | 3/1952 | Weinberg | D5/60 |
| D. 168,422 | 12/1952 | Rose | D5/60 |
| 2,528,183 | 10/1950 | Schmidt | 428/95 |
| 2,797,712 | 7/1957 | Shapiro | 139/383 |
| 2,968,856 | 1/1961 | Allen | 26/51.5 |
| 3,041,703 | 7/1962 | Prell | 26/51.5 |
| 3,688,804 | 9/1972 | Brown et al. | 139/1 |
| 3,704,197 | 11/1972 | Bahlo | 161/67 |
| 4,849,267 | 7/1989 | Ward et al. | 428/41 |
| 4,877,669 | 10/1989 | Endrenyl, Jr. et al. | 428/88 |
| 4,931,343 | 6/1990 | Becker et al. | 428/95 |
| 4,988,551 | 1/1991 | Zegler | 428/40 |

FOREIGN PATENT DOCUMENTS 3224938  9/1988  Japan ........................ 428/105

*Primary Examiner*—George F. Lesmes
*Assistant Examiner*—Terrel Morris
*Attorney, Agent, or Firm*—Willian Brinks Hofer Gilson & Lione

[57] ABSTRACT

A novel carpet and fabric carpet backing are disclosed which include a guide for orienting the carpet with respect to machine direction. The carpet comprises a face portion and a fabric backing with an exposed surface visible from the back side of the carpet. The fabric carpet backing includes a plurality of linear patterns visible from the exposed surface running generally parallel to each other and generally parallel to the same edge of the carpet and running the length of the carpet. Each of these linear patterns includes at least a first and second linear sub-pattern running the length of the pattern. The first and second sub-patterns are visually distinct from one another and are disposed in the same position relative to the other and relative to the edge of the carpet in each of the linear patterns. As a result, a guide is provided by these linear patterns for orienting the carpet with respect to machine direction and left/right, even if the carpet is cut on a line between any two linear patterns. Preferably, the linear patterns are made by weaving yarns of two different colors into the backing in the machine direction.

21 Claims, 2 Drawing Sheets

CARPET AND CARPET BACKING WITH DIRECTIONAL GUIDE

BACKGROUND OF THE INVENTION

The present invention relates to the field of carpet manufacture, and more particularly relates to the field of carpets with direction indicia to aid in properly orienting the carpet.

In general, carpet is manufactured by tufting yarn into a backing material which is unrolled and fed into the tufting machine. Consequently, a machine direction is established for the carpet, namely the direction in which the carpet was tufted. In addition, other operations, such as shearing, coating or printing are performed on the carpet as it passes through a line.

It is important for the installer of carpet to be aware of the machine direction of the carpet so that all the adjacent pieces of carpet can be laid down with the same orientation. With some styles, the orientation with respect to machine direction is readily detectable from the face of the carpet. For example, if the carpet uses a particular tufting pattern with different colors of yarn, the resulting carpet face may have a patently directional appearance. Likewise, a carpet may be printed with a pattern which is patently directional.

In contrast, other styles of carpet have directional differences which are not so obvious from the face of the carpet. In particular, the tufting operation itself imparts a directionality in the pile, which directionality may not be readily apparent on the face of the carpet. Nevertheless, if two pieces of carpet are laid next to each other with different orientations, the mismatch can be unsightly.

In addition to the directionality of the pile, the particular tufting pattern and colors of yarn used may produce a pattern on the face of the carpet which is similar in both directions, but not identical. Likewise, the directionality of a particular printed pattern may be less than obvious. In addition, various operations performed on the carpet during manufacture, such as tip shearing or coating, may produce subtle directional differences. Again, such subtle differences may only become apparent after installation, particularly when two pieces of carpet are laid next to each other in a seam.

One solution to this problem has been for the carpet manufacturers to print arrows showing the machine direction on the back of the carpet along one or both of the carpet's edges. Typically, these arrows would be printed on the back of the carpet at or near the end of the carpet manufacturing process.

Naturally, printing these arrows requires an additional manufacturing step. Also, the outer edge of the carpet may get cut off so that the installer ends up with a piece without any directional guide.

In addition, for some carpet manufacturing processes, it is important that the manufacturer maintain the same orientation for the post-tufting operations. In Other words, it is important for the manufacturer to perform such operations as printing, shearing or coating in the same direction in order to insure uniformity between several rolls of the same style of carpet. Printing arrows on the back of the carpet at the end of the carpet manufacturing process does not provide the manufacturer with a directional guide soon enough in the process to be of assistance.

SUMMARY OF THE INVENTION

Briefly stated, the invention is a carpet and fabric carpet backing which include a guide for orienting the carpet with respect to machine direction and left/right. The carpet comprises a face portion and a fabric backing with an exposed surface visible from the back side of the carpet. The fabric carpet backing includes a plurality of linear patterns visible from the exposed surface running generally parallel to each other and generally parallel to the same edge of the carpet and running the length of the carpet. Each of these linear patterns includes at least a first and second linear sub-pattern running the length of the pattern. The first and second sub-patterns are visually distinct from one another and are disposed in the same position relative to the other and relative to the edge of the carpet in each of the linear patterns. As a result, a guide is provided by these linear patterns for orienting the carpet with respect to machine direction, even if the carpet is cut on a line between any two linear patterns.

In accordance with a preferred embodiment, the carpet backing is a woven fabric and each of the first linear sub-patterns is formed by weaving in the machine direction a yarn of a first color in the fabric and each of the second linear sub-patterns is formed by weaving in the machine direction a yarn of a second color different from the first color in the fabric. More preferably, two yarns of The second color are woven into the backing both on the same side of the yarn of the first color in each of the linear patterns. Most preferably, 4 linear patterns created by these yarns of the first and second color are woven into the backing and spaced even across the backing with about 3 feet between each and about 18 inches from each side of the carpet.

It should be noted that, as used herein, the term "machine direction" is intended to mean the direction in which the carpet is tufted. Thus, the term refers to a line running the length of the carpet as opposed to a line running across the width of the carpet. Importantly, the line this term refers to is also directional. Consequently, the line provides not only length versus width orientation, but also provides right versus left orientation.

The present invention, together with attendant objects and advantages, will be best understood with reference to the detailed description below in connection with the attached drawings.

DETAILED DESCRIPTION OF THE PREFERRED EMBODIMENTS

Figure 1:
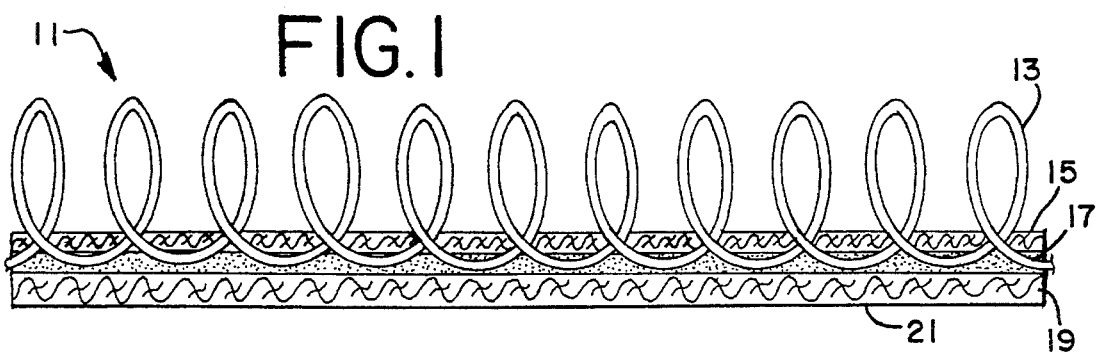
FIG. 1 is a cross-sectional view of a carpet made according to the preferred embodiment of the present invention.

Referring to the drawings, FIG. 1 is a schematic representation of a cross section of a typical construction of carpet 11. As shown, the carpet includes a face portion made up of yarn 13 which has been tufted into a primary backing material 15. While the particular construction shown has loops of yarn 13, the particular construction of the face is not critical to the present invention. As such, other tufted face constructions such as cut pile, textured cut pile, and tip sheared, as well as non-tufted face constructions such as needle punch, woven and fusion bonded, are within the scope of this invention.

Likewise, the selection of the primary backing material 15 is not seen to be critical to the present invention. Thus, the primary backing material can be selected from s variety of materials. Presently, a woven polypropylene fabric, such as that sold by Amoco under the designation POLY BAC® is most preferred.

As shown, after the yarn 13 is tufted into the primary backing material 15, a polymeric coating 17 is typically applied on the back side to thereby lock the tufts of yarn 13 into the primary backing 15. Again, the selection of the particular polymeric coating is not seen to be critical to the present invention. Presently, a Styrene Butadiene Rubber (SBR) latex material filled with $CaCO_3$ is most preferred. Most preferably, the latex is applied at about 28 oz./sq. yd. (OSY).

A fabric secondary backing 19 which provides the surface 21 opposite the face portion is included in carpet construction. Typically, secondary backing is adhered to the carpet through the polymeric coating 17.

The material used in the secondary backing 19 can be selected from a wide variety such as polypropylene, fiberglass, polyester, jute and combinations thereof. Preferably, the secondary backing is a woven material. Most preferably, the secondary backing is a woven polypropylene material such as that sold by Amoco under the designation ACTION BAC®. This particular material include slit film polypropylene in the machine direction woven together with polypropylene spun yarns in the cross direction. Most preferably, there are 8 yarn ends per inch in the machine direction and 5 yarns per inch in the cross direction. Most preferably, the secondary backing has a weight of about 3.50 SY.

Figure 2:
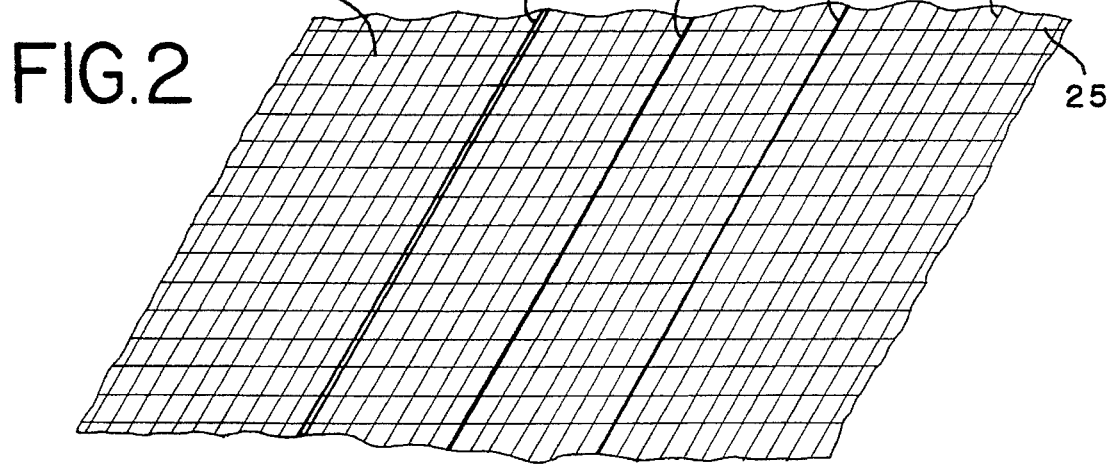
FIG. 2 is a perspective view of the carpet backing of the preferred embodiment.

FIG. 2 is a schematic perspective view of a piece of the preferred material used for the secondary backing 19. As can be seen, this material is a woven material with machine direction yarns 23 and cross direction yarns 25. According to the preferred embodiment of the present invention, this material includes three yarns 27, 29 and 31 which have a color recognizably distinct from the other yarns in the material and which three yarns are woven in the machine direction.

As shown in this most preferred embodiment, each of the 3 yarns 27, 29 and 31 is woven in the backing so as to have 6 yarns between them. This places the 3 yarns slightly less than about 1 inch apart in the carpet backing.

At least one of the three colored yarns has a color which is recognizably distinct from the other two colored yarns. Most preferably, two of the yarns are the same color with the third being different. In this case, the third yarn with the different color is required to be either yarn 27 or 31, that is not the middle yarn 29. Otherwise, if the two outside yarns 27 and 31 had the same color, the pattern would be symmetrical. Such a symmetrical pattern would provide a directional guide for the carpet as to length versus width, but would not provide a directional guide as to left versus right.

Alternatively, all three colored yarns 27, 29 and 31 can have different colors, thereby providing the desired directionality in the pattern.

Preferably, the colored yarns are the same type of yarn used in the rest of the secondary backing material. Most preferably, the colored yarns are pigmented polypropylene yarn such as that used in pigmented versions of the primary backing sold by Amoco under the designation POLY BAC®. Most preferably, the yarn 31 is blue and the yarns 27 and 29 are black.

Figure 3:
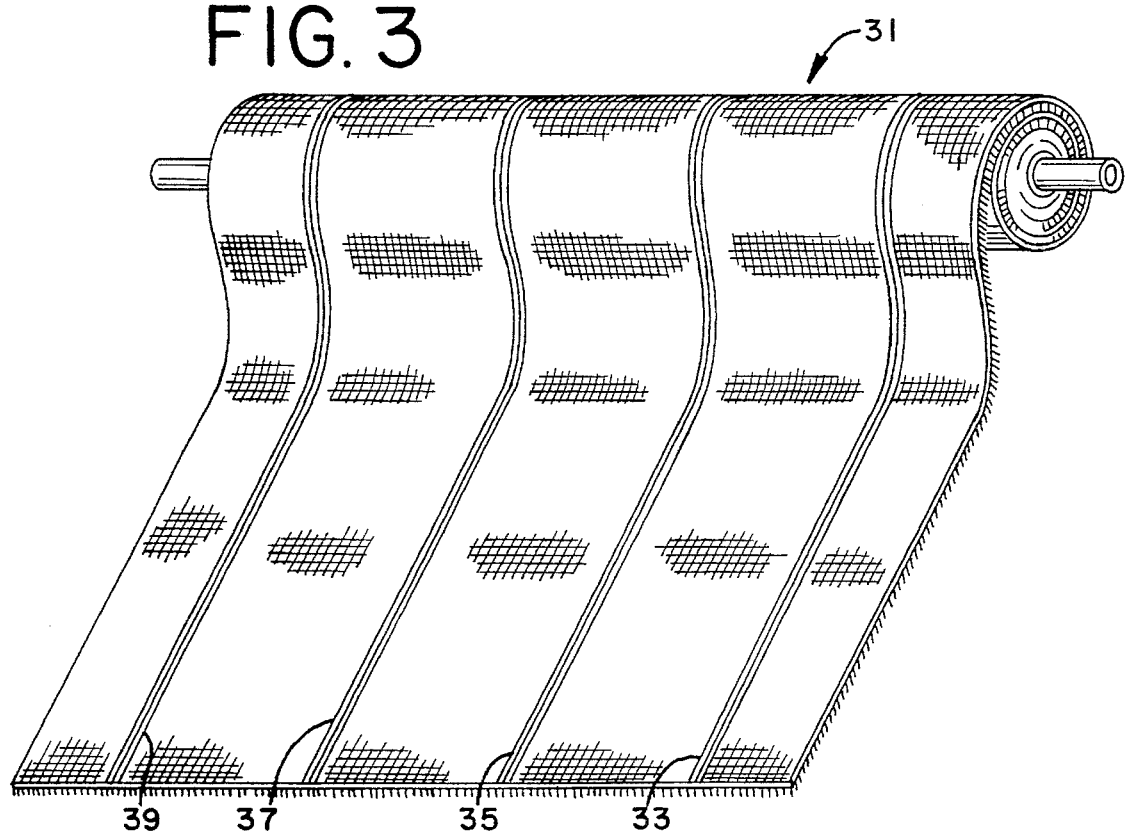
FIG. 3 is a perspective view of the backside of a carpet made with the backing of FIG. 1.

FIG. 3 shows the back side of a carpet made with the backing material of FIG. 2. As can be seen, the carpet, which is the typical 12 feet in width, includes 4 triplets of colored yarns 33, 35, 37 and 39. In accordance with the invention, at least two linear patterns are required. Most preferably, the carpet backing includes four linear patterns as shown here in FIG. 3. Most preferably, the outer triplets 33 and 39 are each about 18 inches from the side of the carpet and the distance between adjacent triplets is about 3 feet. The carpet can be cut in the machine direction along any line between these four triplets and the cut pieces will maintain the directional guide provided by the triplets.

Importantly, all of the triplets are arranged with the same color of yarn being in the same position in each triplet. For example, if the triplets include one blue yarn and two black yarns, then that blue yarn is on the same side of the two black yarns in each one of the triplets.

While the preferred method of producing the different colored lines of the embodiment shown in FIGS. 2 and 3 is to weave in yarns of different colors, these colored lines can be made by alternative methods. For example, the colored lines can be printed on the carpet backing, either before or after it is applied to the carpet.

Figure 4:
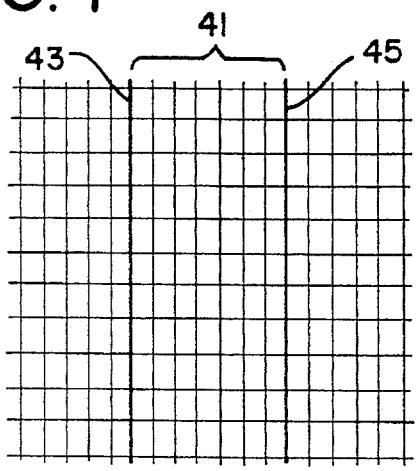
FIG. 4 shows a linear pattern of an alternative embodiment.

FIG. 4 is a schematic representation of an alternative linear pattern useful in the present invention to provide a direction guide. As can be seen, this linear pattern 41 is similar to that shown in FIGS. 2 and 3 except that it includes only two different color lines 43 and 45. While two different colored yarns provides the directional guide of the present invention, using three colored yarns as shown in FIGS. 2 and 3 is present preferred because of the boldness of the pattern and the availability of the colors.

Figure 5:
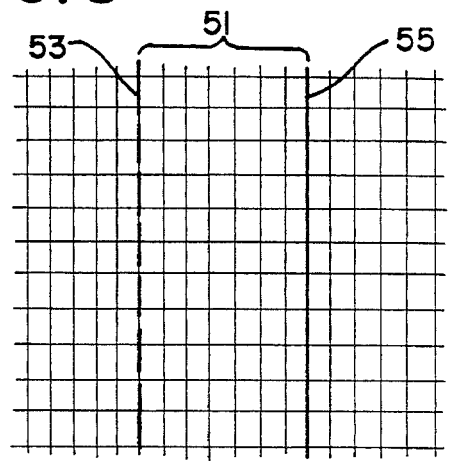
FIG. 5 shows a linear pattern of another alternative embodiment.

FIG. 5 is a schematic representation of another alternative linear pattern to provide a directional guide according to the present invention. As shown, the linear pattern 51 is made up of two lines 53 and 55. Line 53 is a dashed line and line 55 is a solid line. In order to provide a consistent directional guide, when this linear pattern is used, it is important that the dashed and solid line be oriented on the same side of each other in each of the linear patterns included on the carpet backing.

The pattern shown in FIG. 5 can be applied to the carpet backing in a variety of ways. It can be printed on the carpet backing either before or after the carpet backing is applied to the carpet. Also, the pattern can be generated by weaving in a space dyed yarn for the dashed line and a solid color yarn for the solid color. Because the two lines 53 and 55 are visually distinct, it is not necessary that they be made in different colors. Nevertheless, different colors may be used for these lines in order to emphasize the distinctness even more.

Figure 6:
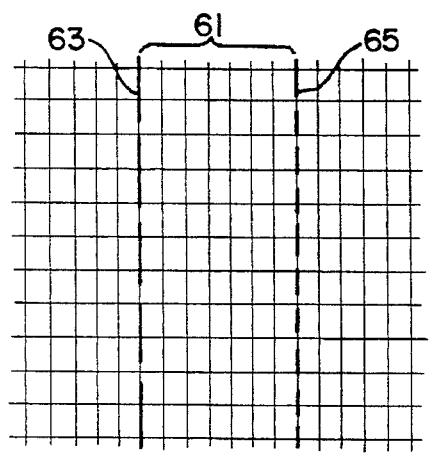
FIG. 6 shows a linear pattern of still another alternative embodiment.

FIG. 6 is a schematic representation of still another alternative linear pattern 61 useful in the present invention. This pattern 61 is made up of two dashed lines 63 and 65 which are each visually distinct from each other. As shown here, the lines 63 and 65 are distinct because line 63 is made up of longer dashes than 65. Alternatively, other ways of making the two dashed lines visually distinct can be used, such as making one with longer spaces between dashes.

Figure 7:
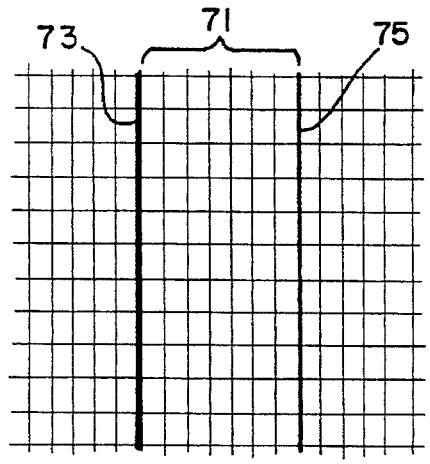
FIG. 7–8 show a linear pattern of still yet another alternative embodiments.

FIG. 7 is a schematic representation of still another alternative linear pattern 71 useful in the present invention.

In this pattern 71, there is a thick line 73 and a thin line 75. Again, this pattern can be made in a variety of ways, such as printing. Also, the pattern may be made by weaving colored yarns into a backing material so that adjacent colored yarns make up a thick line and a single colored yarn makes up a thin line.

Figure 8:
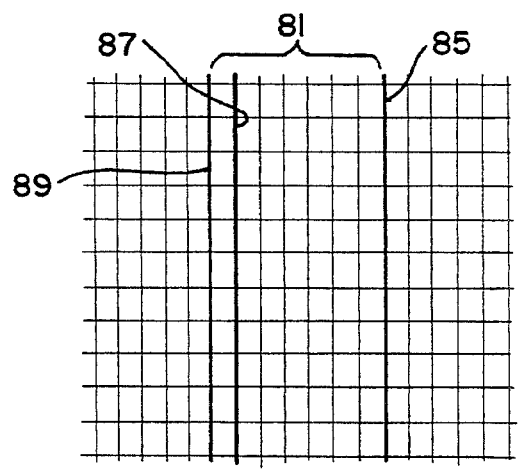

FIG. 8 is a schematic representation of still yet another alternative linear pattern useful in the present invention. In this embodiment, the linear pattern 81 is made up of two visually distinct linear sub-patterns 83 and 85. In particular, the; linear sub-pattern 83 actually comprises two lines 87 and 89 which are relatively close to each other. The linear sub-pattern 85 comprises a single line. Preferably, in this pattern, the two lines 87 and 89 are the same color and the line 85 is a different color.

As noted above, the preferred method of applying linear patterns to the carpet and backing is to weave different colored yarns into the backing material. This provides the advantage that the directional guide is provided integrally with the carpet backing. That is, the carpet manufacturer can obtain the carpet backing with the directional guide already present. As a result, the carpet manufacturer does not need to add any steps to its process, such as printing a directional guide on the carpet backing. Also, the directional guide is available to the carpet manufacturer as soon as the backing is applied to the carpet. Thus, the carpet manufacturer can use the directional guide to insure that rolls of carpet are oriented the same as they go through operations such as printing, shearing or coating.

It should be noted that, although much of the discussion has involved woven carpet backings, other types of backing fabrics can also be used. For example nonwoven fabrics such as spunbond polyester can also be used. In addition polyester fleece can also be used. Also, although much of the discussion has involved the preferred method of weaving colored yarns into a woven fabric backing, ,the linear patterns may be applied by other means such as printing or dyeing. Certainly, these and all other modifications which are within the ordinary skill in the art to make are considered to lie within the scope of the invention as defined by the appended claims.

We claim:

1. A carpet comprising:
   a face portion
   a fabric backing with an exposed surface visible from the back side of the carpet, and with an edge running the length of the carpet; and
   a plurality of linear patterns visible from the exposed surface running parallel to each other and parallel to the edge and running the length of the carpet, each of said linear patterns comprising at least a first and second linear sub-pattern running the length of the pattern, with the first and second subpatterns being visually distinct from one another, the first sub-pattern in each linear pattern being disposed closer to the edge than the second sub-pattern in that linear pattern, each of the linear patterns being asymmetrical about a center line passing between the first and second linear subpatterns;
   whereby a guide for orienting the carpet with respect to machine direction is provided, even if the carpet is cut on a line between any two linear patterns.

2. The carpet of claim 1 wherein the first linear sub-pattern is a line having a first color and the second linear sub-pattern is a line having a second color different from the first.

3. The carpet of claim 1 wherein the first linear sub-pattern is a dashed line and the second linear sub-pattern is a solid line.

4. The carpet of claim 1 wherein the first linear sub-pattern is a dashed line and the second linear sub-pattern is also a dashed line which is visually distinct from the dashed line of the first linear sub-pattern.

5. The carpet of claim 1 wherein the first linear sub-pattern is a solid line and the second linear sub-pattern is a solid line with a noticeably different width than the solid line of the first linear sub-pattern.

6. The carpet of claim 1 wherein the carpet backing is a woven fabric and the first linear: sub-pattern is formed by weaving a yarn of a first color in the fabric and the second linear sub-pattern is formed by weaving a yarn of a second color different from the first color in the fabric, and wherein the first and second colors are different from the color of the other yarn in the backing.

7. The carpet of claim 6 wherein the second linear sub-pattern includes two yarns of the second color which are both on the same side of the yarn of the first color in each of the linear patterns.

8. The carpet of claim 6 wherein the yarns are woven into the fabric in the machine direction.

9. The carpet of claim 8 wherein at least three linear patterns are evenly spaced across the width of the carpet backing.

10. The carpet of claim 9 wherein the linear patterns are spaced at intervals between about 2 feet and about 4 feet.

11. The carpet of claim 9 wherein the linear patterns are spaced at intervals of about 3 feet.

12. The carpet of claim 1 wherein the linear patterns are printed on the exposed surface of the carpet backing.

13. The carpet of claim 12 wherein the linear patterns are printed on the exposed surface of the carpet backing before the backing is applied to the rest of the carpet.

14. The carpet of claim 1 wherein the carpet backing includes at least four linear patterns located generally symmetrically across the width of the carpet backing.

15. The carpet of claim 1 wherein the linear patterns run the length of the carpet in the machine direction and wherein the linear patterns are spaced between about 2 and about 4 feet across the width of the carpet backing.

16. A carpet comprising:
   a face portion
   a woven backing with an exposed surface visible from the back side of the carpet, and with an edge running the length of the carpet; and
   a plurality of pairs of colored yarns woven into the backing so as to run parallel to each other and parallel to the edge and to run the length of the carpet, each of said pairs comprising a first yarn of a first color and a second yarn of a second color different from the first, said first and second colors being different from the color of the yarns in the rest of the backing, the first yarn of each pair being disposed closer to the edge than the second yarn in that pair;
   whereby a guide for orienting the carpet with respect to machine direction is provided, even if the carpet is cut on a line between any two pairs of yarns.

17. The carpet of claim 16 wherein each of the yarns is woven into the fabric in the machine direction.

18. The carpet of claim 16 wherein at least three pairs of yarns are evenly spaced across the; width of the carpet backing.

19. The carpet of claim 18 wherein the pairs are spaced at intervals between about 2 feet and about 4 feet.

20. The carpet of claim 18 wherein the pairs are spaced at intervals of about 3 feet.

21. The carpet of claim 16 wherein an additional yarn of the second color is woven into the backing so as to be parallel and adjacent to each of the second yarns.

* * * * *